(12) United States Patent
Linev et al.

(10) Patent No.: US 11,660,642 B1
(45) Date of Patent: May 30, 2023

(54) METHOD AND APPARATUS FOR AUTOMATIC SORTING OF UNMARKED POWER CELLS

(71) Applicant: ADANI Systems, Inc., Alexandria, VA (US)

(72) Inventors: Vladimir N. Linev, Minsk (BY); Iouri Emelianov, Minsk (BY); Siarhei Baranouski, Minsk (BY); Leonid Kurch, Minsk (BY); Katsiaryna Ustsimenka, Minsk (BY)

(73) Assignee: Linev Systems US, Inc., Alexandria, VA (US)

( * ) Notice: Subject to any disclaimer, the term of this patent is extended or adjusted under 35 U.S.C. 154(b) by 422 days.

(21) Appl. No.: 17/087,478

(22) Filed: Nov. 2, 2020

(51) Int. Cl.
| | |
|---|---|
| *B07C 5/34* | (2006.01) |
| *G01N 23/04* | (2018.01) |
| *G01N 23/083* | (2018.01) |
| *G06V 30/18* | (2022.01) |
| *G06F 18/22* | (2023.01) |
| *G06F 18/2413* | (2023.01) |
| *G06V 30/14* | (2022.01) |

(52) U.S. Cl.
CPC ........... *B07C 5/3416* (2013.01); *G01N 23/04* (2013.01); *G01N 23/083* (2013.01); *G06F 18/22* (2023.01); *G06F 18/2413* (2023.01); *G06V 30/1429* (2022.01); *G06V 30/18* (2022.01); *G01N 2223/401* (2013.01); *G01N 2223/639* (2013.01)

(58) Field of Classification Search
CPC .. B07C 5/3416; B07C 2501/00; G06V 10/40; G06F 18/22; G06F 18/2413; G01N 23/04; G01N 2223/401
See application file for complete search history.

(56) References Cited

U.S. PATENT DOCUMENTS

| | | | |
|---|---|---|---|
| 5,663,997 | A | 9/1997 | Willis et al. |
| 9,128,030 | B1 * | 9/2015 | Safai ................. G01M 3/38 |
| 2010/0303287 | A1 | 12/2010 | Morton |
| 2017/0225200 | A1 * | 8/2017 | Makino ............... G01N 23/04 |
| 2022/0416323 | A1 * | 12/2022 | Diegoli ............... B07C 5/3416 |

FOREIGN PATENT DOCUMENTS

| | | |
|---|---|---|
| EP | 1132992 A1 | 9/2001 |
| EP | 0795919 B1 | 1/2002 |

OTHER PUBLICATIONS

Search Report in PCT/US 21/50733, dated Dec. 14, 2021.
Written opinion in PCT/US 21/50733, dated Dec. 14, 2021.

* cited by examiner

*Primary Examiner* — Prasad V Gokhale
*Assistant Examiner* — Jessica L Burkman
(74) *Attorney, Agent, or Firm* — Bardmesser Law Group (57) ABSTRACT

Method for automatic sorting of batteries, the method including generating a fan-shaped X-ray beam; scanning the batteries with the fan-shaped X-Ray beam; for each battery, capturing X-rays that pass though the battery with an X-ray detector and converting the X-rays into first and second digital images, wherein the first digital image represents X-rays at a first energy, and the second digital image represents X-rays at a second energy; automatically analyzing the first and second digital images to determine a type of the battery by identifying characteristic features of each battery type based on a gray spectrum of at least 8 bit resolution that is looked up in a model database branch; and sorting the batteries by type.

14 Claims, 7 Drawing Sheets

METHOD AND APPARATUS FOR AUTOMATIC SORTING OF UNMARKED POWER CELLS

FIELD OF THE INVENTION

The present invention relates to automated sorting of used batteries and power cells.

BACKGROUND OF THE RELATED ART

Currently, there is a wide variety of primary (batteries) and secondary (rechargeable batteries) power cells. Depending on the active ingredients in electrolytic cells, they may belong to specific types, such as nickel—cadmium, lithium, zinc—carbon, nickel—metal hydride batteries, etc.

Primary and secondary power cells that are available on the market also contain extremely toxic heavy metals, such as mercury, cadmium or lead, in various concentrations, depending on their electrochemical base.

In order to prevent toxic substances contained in used-up power cells from going to waste and polluting the environment, many developed countries have set up public battery collection points, where bins are filled with lots of power cells containing different electrochemical substances.

Some power cells may also contain precious metals, such as silver, nickel, cadmium, or zinc, and in much higher concentrations than natural ores. Therefore, it is reasonable to recycle such power cells and use metals contained therein in metallurgy. However, perfect sampling (more than 99% accuracy) has to be provided.

Therefore, used-up power cells that have been thrown away into recycling bins have to be sorted by their electrolytic type.

Optical sorting or sorting by specific mass of a power cell, when used on an industrial scale, lack precision, since distinctive features are well discerned in theory only, while in practice accurate identification is almost impossible.

For example, if used-up batteries and/or rechargeable batteries are stored in adverse conditions for a long time, their specific mass, as well as battery type labels that are used by optical identification systems, may vary significantly due to water accumulation, electrolyte leaks, or corrosion. Besides, a wide range of counterfeit power cells or brand imitations is currently available on the market.

There is a number of conventional methods for automatic sorting of used-up power cells. As disclosed in DE19610093A1 (corresponding to EP0795919A2), used-up power cells are identified by comparing a gray spectrum that is obtained from an X-Ray image with the model. According to another method, power cells are identified by measuring their weight, size, ferromagnetic properties and eddy current when passing through a coil (see WO 94/19838, DE69203091T2, EP0580241A2). According to yet another method, power cells are identified by processing labeled images (see *Proceedings of the* 4th International Battery Recycling Congress, Hamburg, Germany, Jul. 1-3, 1998).

The solution disclosed in DE19610093A1 is closely related to the claimed method. The detector-to-image conversion unit continuously generates video images and sends them to the processing computer. The computer first selects images that show the entire used-up power cell (image synchronization). Then, the computer digitizes the video image and analyzes it in grayscale in order to generate a gray spectrum. Basically, a spectrum may comprise any number of shades, but in order to maintain lower processing load, the number of shades should not be too high. Typically, 16 shades of gray is enough. Then, the resulting gray spectrum is compared with model gray spectra for each separate type of used-up power cells.

However, this method overlooks certain points. Currently, there are more than 2700 power cell types ranging from AAAA to D, because different manufacturers use different technologies and designs. While a used-up power cell may have a cylindrical shape and symmetrical appearance, X-Ray images of its internal structure may differ a lot depending on its position on the conveyor belt, because internal structure is affected by discharging and aging. Changes in internal structure usually asymmetrical relative to the power cell axis, which is why a single sample may produce different spectra when shot in different positions. Therefore, in order to make this method fully effective, a database of tens of thousands model gray spectra is required. Also, in order to reliably identify power cells, one has to use hi-res spectra with more than 16 shades of gray. This provides limitations to the sorting speed, since it is very difficult to generate a sample and compare in to a model database of tens of thousands entries in just 100 msec. Using gray spectra as both the sample and model, when the database is this large, won't allow to reliably distinguish power cells of different types which have similar internal structures. Also, when the model database is generated from video images at two-pixel resolution, there will be overlaps between similar-looking batteries of different types, which will make sorting less accurate.

Accordingly, there is a need in the art for a more efficient and faster system and method for sorting used power cells.

SUMMARY OF THE INVENTION

Accordingly, in one aspect, there is provided a method for automatic sorting of batteries, the method including generating a fan-shaped X-ray beam; scanning the batteries with the fan-shaped X-Ray beam; for each battery, capturing X-rays that pass though the battery with an X-ray detector and converting the X-rays into first and second digital images, wherein the first digital image represents X-rays at a first energy, and the second digital image represents X-rays at a second energy; automatically analyzing the first and second digital images to determine a type of the battery by identifying characteristic features of each battery type based on a gray spectrum of at least 8 bit resolution that is looked up in a model database branch; and sorting the batteries by type.

Optionally, type is determined based on the expanded gray spectrum using size indices and gray indices of distinctive regions in the batteries. Optionally, the method further includes identifying distinctive regions and combinations thereof, wherein the distinctive regions include gray contrasts that indicate an anode current collector, porous separator, and plastic cover, which are unique for each individual battery type, and then indexing the distinctive regions. Optionally, the expanded gray spectrum includes 65,535 shades of gray. Optionally, the database includes a model database branch index used for finding a branch that corresponds to the battery type. Optionally, each branch in the database has its own index. Optionally, comparisons between the expanded gray spectra for the sample are made within the model base branch having a corresponding index only.

In another aspect, an apparatus for automatic sorting of batteries includes a slanted conveyor with a guiding plank for placing batteries; an X-Ray source generating a fan-shaped X-ray beam; a dual-energy detector for detecting the X-ray beam at two different energies from the X-ray source; a processing computer; a positioning system responsive to the processing computer; and a discharge system with discharging funnels for sorting the batteries. The detector detects the X-ray beam after it passes through the batteries. For each battery, the processing computer converts the X-rays into first and second digital images, wherein the first digital image represents X-rays at a first energy, and the second digital image represents X-rays at a second energy. The processing computer analyzes the first and second digital images to determine a type of the battery by identifying characteristic features of each battery type based on a gray spectrum of at least 8 bit resolution that is looked up in a model database branch.

Optionally, the positioning system comprises at least one battery sensor, a conveyor position sensor, and a controller. Optionally, the slanted conveyor runs through a scanner tunnel. Optionally, the discharging funnels are mounted at a fixed distance from the scanner and at certain intervals, and wherein dedicated containers are placed along the conveyor. Optionally, protective screens that block scatter radiation. Optionally, imaging positioning prevents battery image from being superimposed by that of the guiding plank.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

To overcome this issue, an expanded gray spectrum algorithm is proposed that separates comparison branches. The gray spectrum is generated from a hi-res grayscale image at 16-bit color depth (65,536 shades of gray). Two images—high-energy image and low-energy image—are used. When a model spectrum is generated, it is first indexed in accordance with the dimensions of the original image and gray values in distinctive regions for a given type.

Figure 1:
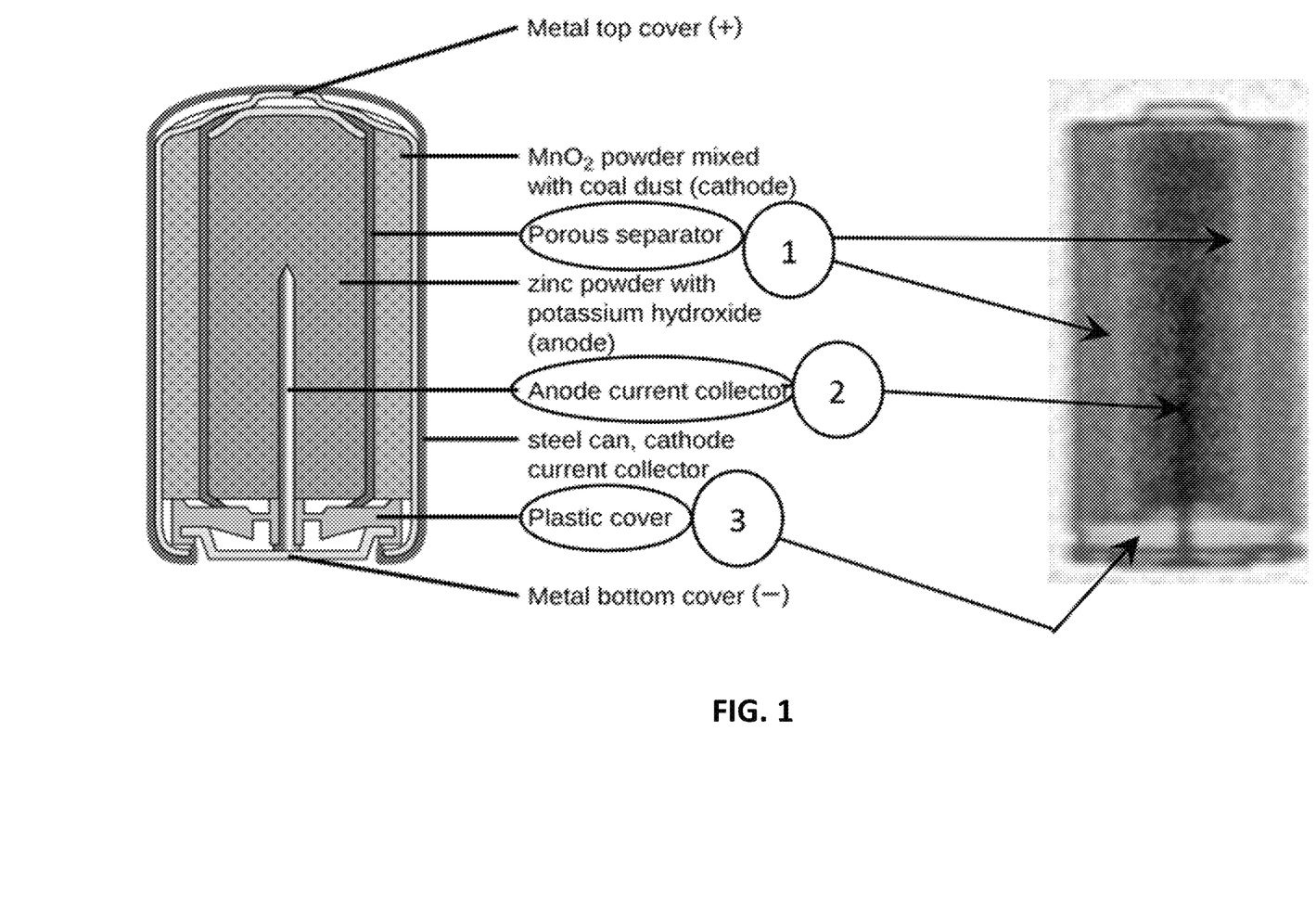
FIG. 1 illustrates regions within an exemplary battery (type 1 from the five basic types, shown in FIG. 7), as seen on an X-ray.

Each power cell type has its own distinctive regions that can be automatically identified in X-Ray images based on the internal structure of a power cell. FIG. 1, left side and FIG. 1, right side, illustrate examples of such distinctive regions, where FIG. 1, left side illustrates internal structure of a power cell (Type 1), and FIG. 1, right side is the X-Ray image of the same power cell (Type 1).

According to the existing power cell sorting algorithm, first, distinctive regions for each power cell type have to be found, e.g. porous separator 1, anode current collector 2, plastic cover 3, etc. (see FIG. 1).

Figure 7:
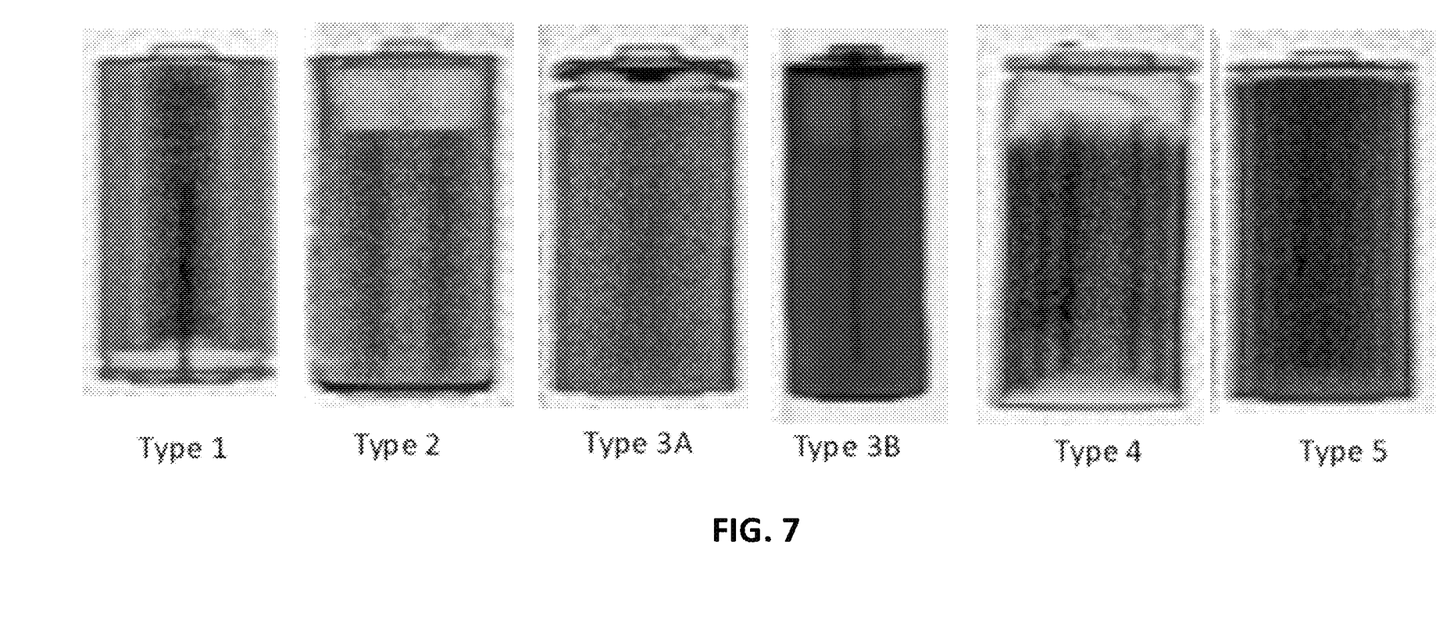
FIG. 7 shows five basic types of the power cells to be sorted.

By comparing distinctive regions of different power cell types, unique regions and combinations thereof are defined for each individual type, which are then indexed. FIG. 7 shows that each type of batteries has: different widths, lengths, place of attachment of the central electrode, which is clearly visible in the X-Ray images. FIG. 7 shows the primary types of batteries: type 1—alcali, type 2—salt (Zn-C, Mn-Zn), type 3—Li-Ion (A—spiral type, B—wound type), type 4—Ni-Cd, type 5—Ni-metal hydride (Ni-Mh). The homogeneous structure of the main body of the electrode can be distinguished from the striped image of the spiral arrangement of the negative-positive electrode group.

The more unique distinctive regions with corresponding indices there are for each power cell type, the more reliable the automatic sorting procedure is when it comes to separating power cells by type).

Such indexation allows to generate a plurality of separate branches in the model database. Therefore, when a sample is compared with the model database, only one branch is used, which greatly increases the speed of analysis, freeing computer resources and allowing to use hi-res gray spectra that have been generated from detailed images at 16-bit color depth (65,536 shades of gray).

Figure 2:
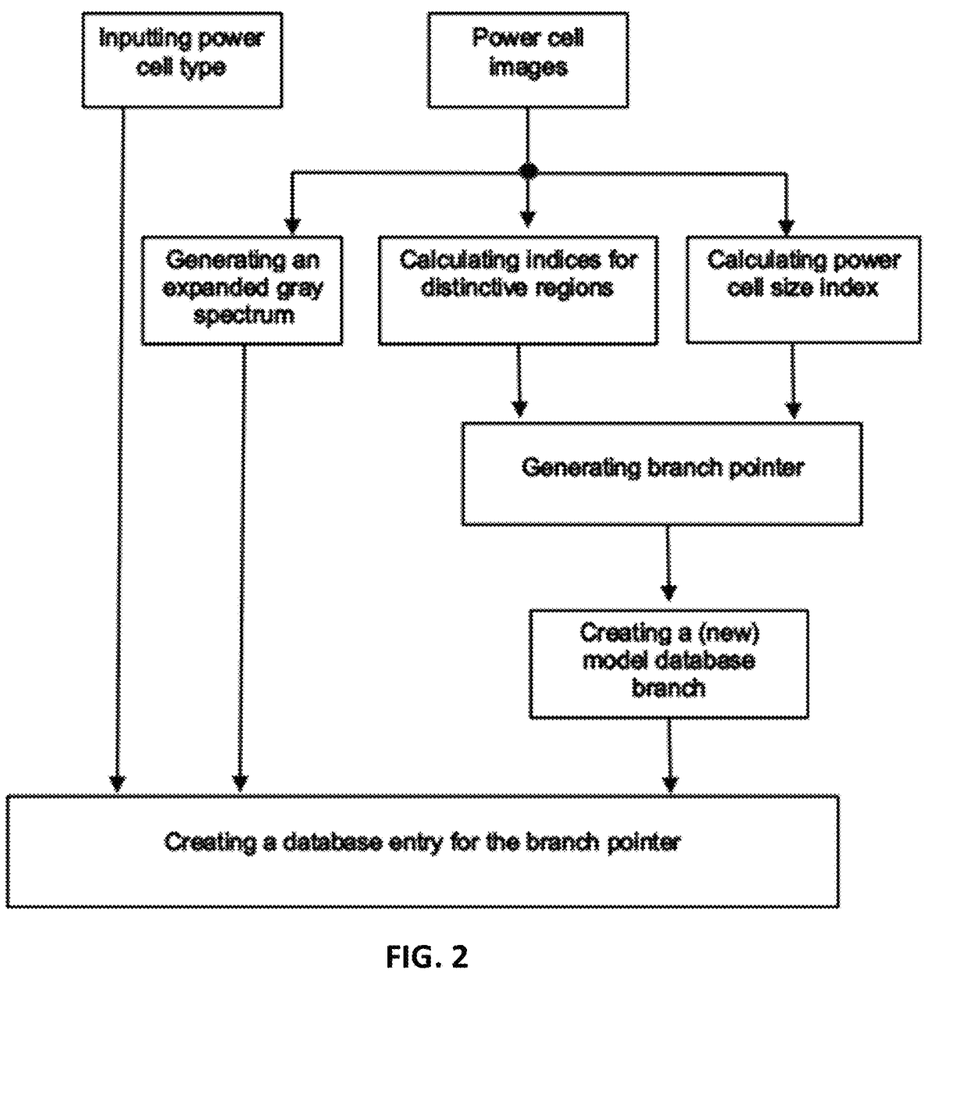
FIG. 2 illustrates an algorithm for creating a database element.
Figure 3:
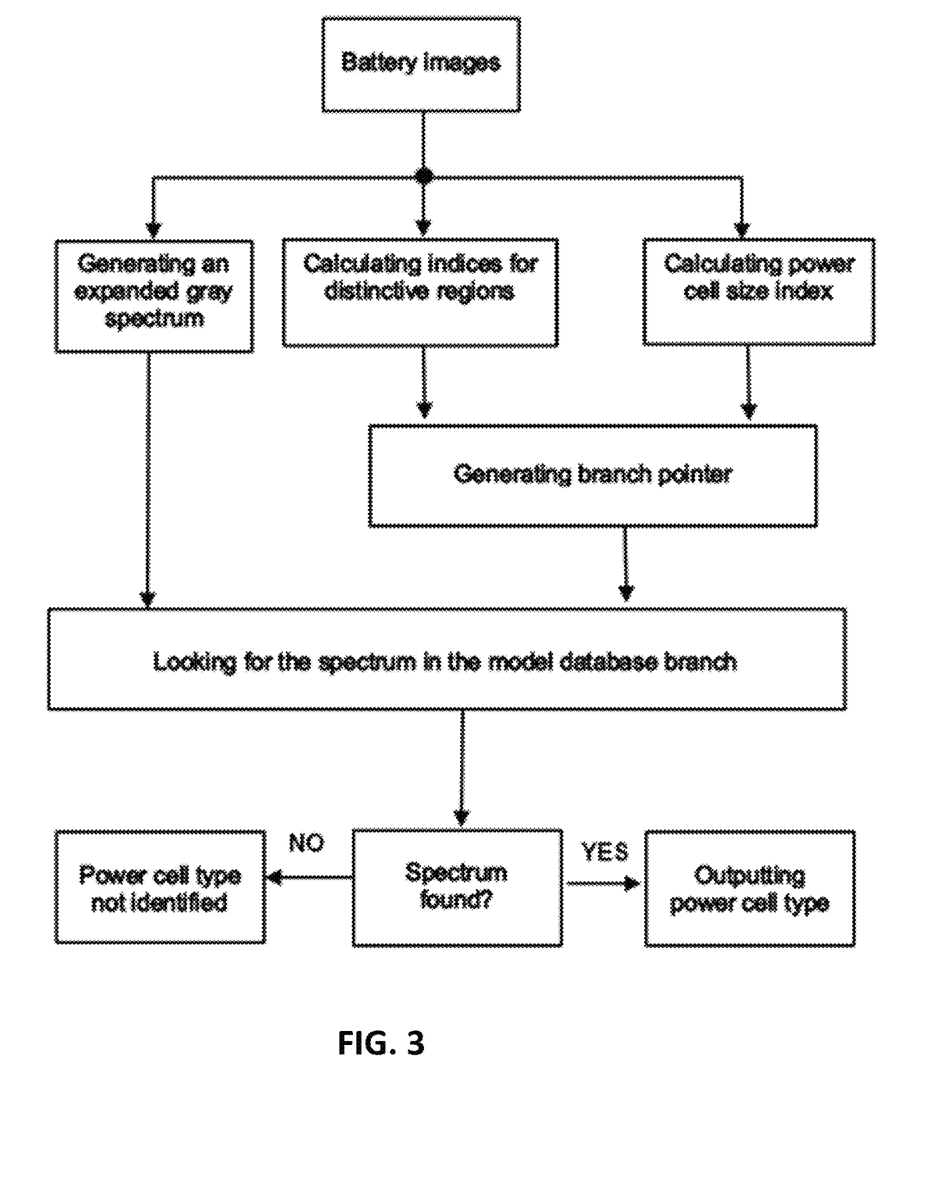
FIG. 3 illustrates a battery recognition algorithm.

This approach allows to maintain recognition speed of up to 50 msec, at 99%+ accuracy. FIG. 2 illustrates an algorithm for creating a database element. FIG. 3 illustrates a recognition algorithm.

An X-Ray dose detector and an apparatus from sorting used-up power cells, as disclosed in EP1132992B1, is closely related to the claimed apparatus. The apparatus according to EP1132992B1 comprises a dosing device, two slanted conveyors moving at different speeds and equipped with a guiding plank, an X-Ray source, two fluorescent X-Ray screens mounted into the guiding plank, two optical lines with phototransistors, and a pneumatic sorting device. This apparatus employs the identification method according to DE19610093A1.

In this apparatus, power cells have to be spaced minimum 10 cm apart, so that they can be captured and then sorted. Therefore, in order to achieve required performance parameters, scanning speed has to be increased, which, in turn, leads to increased source power, increased detector speed, and deteriorated image quality. Also, increased source power imposes additional construction costs to protect personnel from scatter radiation that spreads along the conveyor belt.

To overcome this issue, a power cell positioning system may be installed on the conveyor belt of the apparatus (see FIG. 5), the positioning system comprising an optical sensor 13, a conveyor position sensor 15, and a controller 9. This system locates power cells, thus allowing to accurately capture is image with the detector 7, and then discharging funnels 14 generate a blowing impact that is equal to the power cell length in order to remove the power cell from the scanner. This solution allows to reduce the distance between power cells to 5 cm, thus reducing scanning speed and source power, while maintaining same sorting performance The apparatus according to EP1132992B1 comprises a detector, which is made of two fluorescent screens mounted apart from each other, with two phototransistors that are connected to the screens via optic fiber cables. This apparatus generates battery images that are two pixels wide, which is not enough to generate an expanded gray spectrum that allows to identify power cell type by means of X-Ray crystallography.

Holes in the fluorescent screens that are mounted into the guiding plank come into direct contact with the power cell that is moved along. Thus, the holes will be filled with a mixture of electrolytes and battery case oxides, which will result in identification errors.

Another problem is that particles of chemically active electrolytes hang in the air, which directly affects performance of both the generator and detector, as well as other electronic parts.

Figure 4:
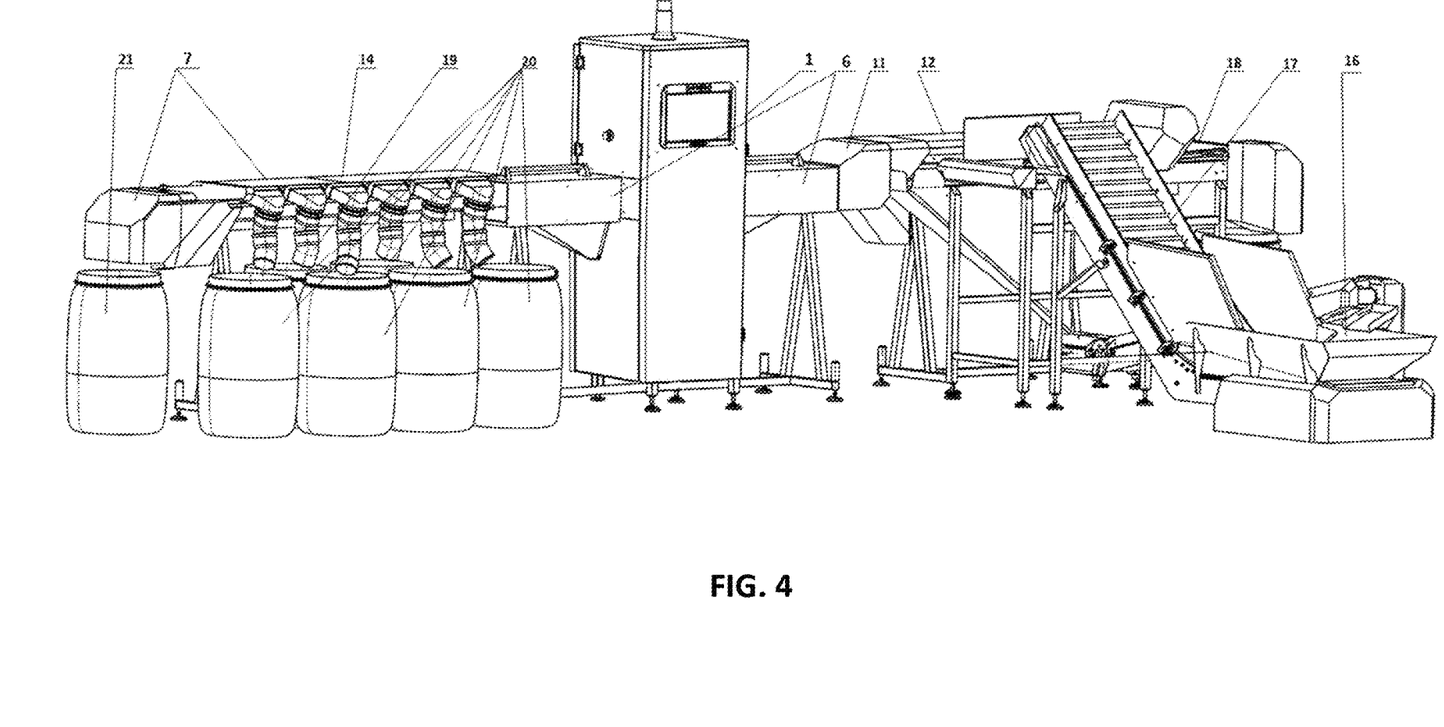
FIG. 4 illustrates a preferred embodiment of the apparatus for sorting power cells.

To overcome these issues, an apparatus for automatic sorting of unmarked power cells is proposed. FIG. 4 illustrates a preferred embodiment of the apparatus for sorting power cells.

The main components of the apparatus for automatic sorting of unmarked power cells, as shown in FIG. 4, are:
1. X-Ray scanner;
16. Feeding bin, where used-up power cells are loaded;
17. Feeding conveyor to move power cells from the feeding bin 16 to the aligning conveyor 18;
18. Aligning conveyor;
12. Feeding conveyor;
6. Main slanted conveyor;
11. Protective screens;
14. Discharging funnels that blow sorted power cells from the main conveyor;
19. Guiding grooves;
20. Containers, where sorted power cells are collected;
21. Container for unidentified power cells.

Figure 5:
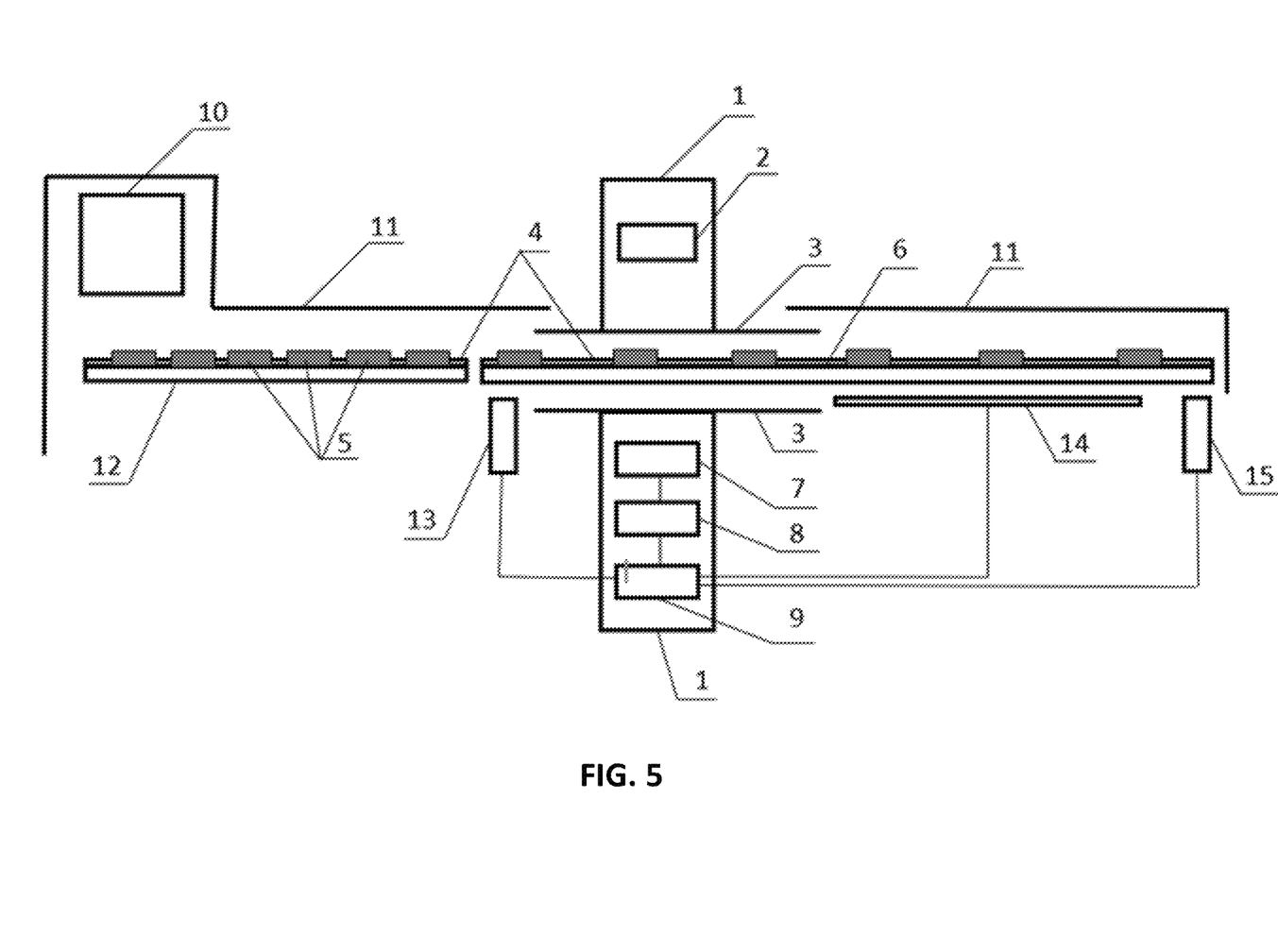
FIG. 5 shows a diagram of the apparatus for automatic sorting of unmarked power cells.

FIG. 5 is a diagram of the apparatus for automatic sorting of unmarked power cells, showing major functional parts. In this figure:
1. X-Ray scanner;
2. X-Ray source;
3. Scanner tunnel;
4. Guiding plank;
5. Used-up power cells;
6. Main slanted conveyor;
7. Detector;
8. Processing computer;
9. Controller;
10. Feeding system that comprises the feeding bin 16, Feeding conveyor 17 and aligning conveyor 18 (see FIG. 4);
11. Protective screens;
12. Feeding conveyor;
13. Optical power cell sensor;
14. Discharging funnels;
15. Conveyor position sensor.

Figure 6:
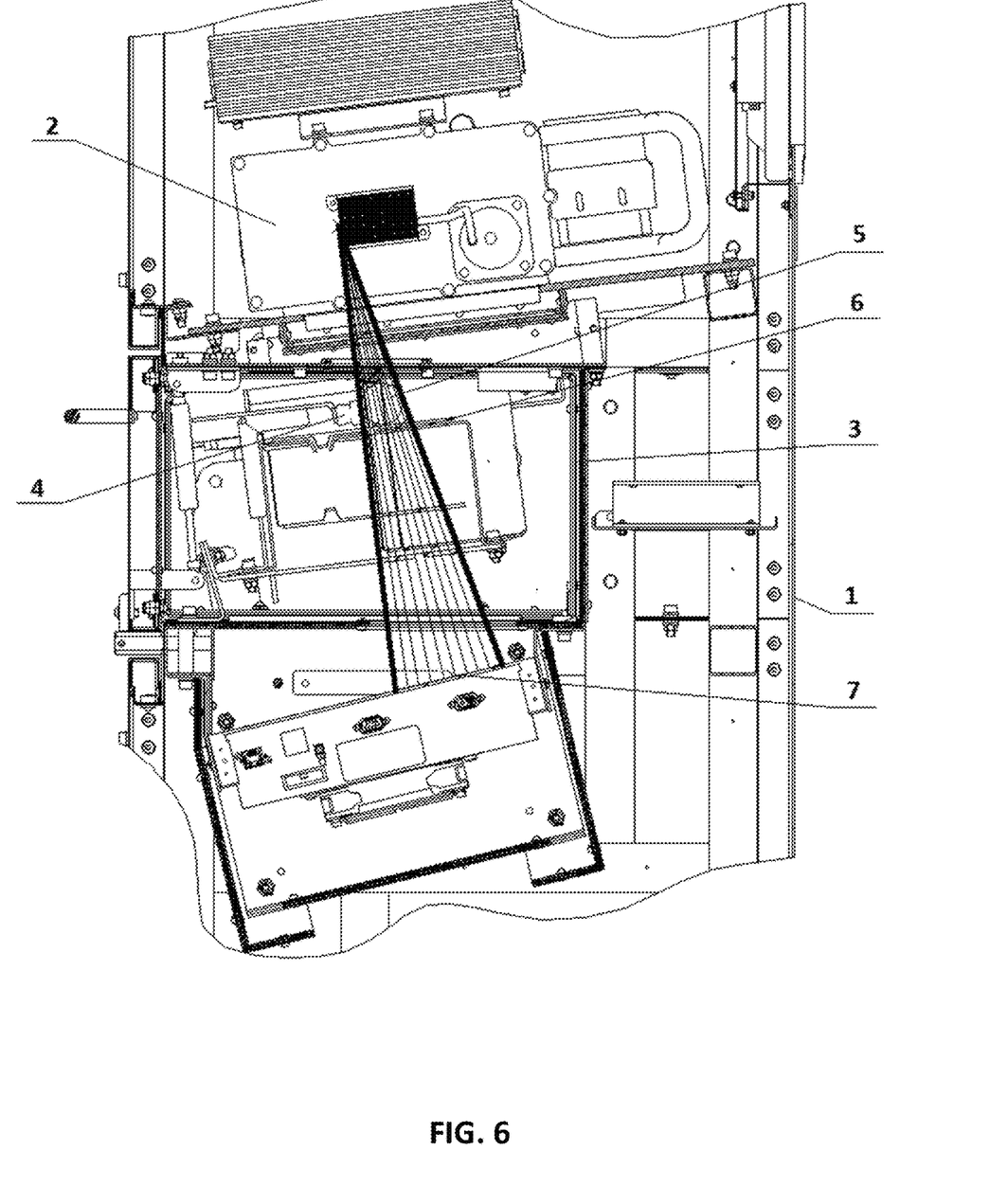
FIG. 6 shows major functional parts of the X-Ray scanner.

FIG. 6 shows major functional parts of the X-Ray scanner. In this figure:
1. X-Ray scanner;
2. X-Ray source;
3. Scanner tunnel;
4. Guiding plank;
5. Used-up power cells;
6. Slanted conveyor;
7. Detector.

In the exemplary embodiment, main specifications and operation modes of major functional parts of the X-Ray scanner, as shown in FIG. 6, may be as follows:
optimum operation modes for the X-Ray source 2 is as follows: anode voltage of 180-200 kV, anode current of 2.0-2.6 mA;
focal spot size suitable for identifying the internal structure of power cells and sorting them is 0.8 mm;
effective sensor size of the detector 7 may be 0.8 mm;
either single-energy or dual-energy scintillation detector, as well as a semiconductor detector for direct counting of photons, with cadmium tellurium (CdTe) active layer, may be used.

Functional features of a semiconductor detector for direct counting of photons may be illustrated by the following example:

In the exemplary embodiment, the active length of the detector array is 100 mm and the active width of each detector array is 6.4 mm Each detector array has 64 pixel lines and the size of each pixel is 0.1 by 0.1 mm.

In order to obtain the required pixel size of 0.8 mm, 8×8 pixel binning may be used.

This detector may operate in both single-energy and dual-energy mode.

The detector array allows using algorithms for generating a high-contrast image, while moving the power cell through the X-Ray beam at a high speed.

A digital image is formed, so that the number of elements (pixels) along one coordinate (in the scanning direction) is determined by the number of scanning steps (number of readings) and the number of detectors in the direction perpendicular to the scanning direction along the other coordinate.

The detector receives X-rays and generates images in TDS (Time Delayed Summation) mode, i.e. when an object moves across the detector in such a way that the same area is imaged one row at a time, thus allowing each row to be summed in order to get a more statistically accurate sample of a given section of the object. These samples form lines in the output image, so as to form a complete scan of the object.

In TDS mode, detector pixel values are shifted along rows during image acquisition to compensate for detector motion. This detector is a non-scintillating detector type (e.g., cadmium-telluride) that allows counting the photons directly.

This detector allows to generate quality X-Ray images using relatively low-current X-ray sources, e.g., up to 2.5 mA of the current requirements for the X-ray source.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

What is claimed is:

1. A method for automatic sorting of cylindrical batteries, the method comprising:
generating a fan-shaped X-ray beam;
scanning the cylindrical batteries with the fan-shaped X-Ray beam;
for each cylindrical battery, capturing X-rays of the fan-shaped X-Ray beam that pass though the battery with a dual-energy X-ray detector and converting the X-rays into first and second digital images, wherein the first digital image represents X-rays at a first energy, and the second digital image represents X-rays at a second energy;

automatically analyzing the first and second digital images to determine a type of the cylindrical battery by identifying characteristic internal features of each battery type, including anode current collectors, based on a gray spectrum of at least 8 bit resolution that is looked up in a model database; and sorting the cylindrical batteries by type.

2. The method of claim 1, wherein the type is determined based on the gray spectrum using size indices and gray indices of the characteristic internal features in the cylindrical batteries.

3. The method of claim 1, wherein the characteristic internal features also include gray contrasts that indicate a porous separator and a plastic cover, which are unique for each individual battery type, and further comprising indexing the characteristic internal features for the model database.

4. The method of claim 1, wherein the gray spectrum includes 65,535 shades of gray.

5. The method of claim 1, wherein the model database includes a branch index used for finding a branch that corresponds to the battery type.

6. The method of claim 5, wherein each branch in the model database has its own index.

7. The method of claim 6, wherein comparisons between the gray spectra for the sample are made within the model database branch having a corresponding index only.

8. An apparatus for automatic sorting of cylindrical batteries, the apparatus comprising:

a slanted conveyor with a guiding plank for placing batteries;

an X-Ray source generating a fan-shaped X-ray beam;

a dual-energy detector for detecting the X-ray beam at two different energies from the X-ray source;

a processing computer;

a positioning system responsive to the processing computer; and a discharge system with discharging funnels for sorting the cylindrical batteries, wherein the dual-energy detector detects the X-ray beam after it passes through the batteries;

for each battery, the processing computer converts X-rays of the fan-shaped X-Ray beam into first and second digital images, wherein the first digital image represents the X-rays at a first energy, and the second digital image represents the X-rays at a second energy; and the processing computer analyzes the first and second digital images to determine a type of the cylindrical battery by identifying characteristic internal features of each battery type, including anode current collectors, based on a gray spectrum of at least 8 bit resolution that is looked up in a model database.

9. The apparatus of claim 8, wherein the positioning system comprises at least one battery sensor, a conveyor position sensor, and a controller.

10. The apparatus of claim 8, wherein the slanted conveyor runs through a scanner tunnel.

11. The apparatus of claim 8, wherein the discharging funnels are mounted at a fixed distance from the scanner and at certain intervals, and wherein dedicated containers are placed along the conveyor.

12. The apparatus of claim 8, further comprising protective screens that block scatter radiation.

13. The apparatus of claim 8, wherein imaging positioning prevents battery image from being superimposed by that of the guiding plank.

14. A method for automatic sorting of batteries, the method comprising:

generating a fan-shaped X-ray beam;

scanning the batteries with the fan-shaped X-Ray beam;

for each battery, capturing X-rays that pass though the battery with an X-ray detector and converting the X-rays into first and second digital images, wherein the first digital image represents X-rays at a first energy, and the second digital image represents X-rays at a second energy;

automatically analyzing the first and second digital images to determine a type of the battery by identifying distinctive regions of each battery type based on a gray spectrum of at least 8 bit resolution that is looked up in a database, wherein the distinctive regions include gray contrasts that indicate an anode current collector, a porous separator, and a plastic cover, which are unique for each individual battery type, and then indexing the distinctive regions; and sorting the batteries by type.

* * * * *